United States Patent
Zhang et al.

(10) Patent No.: US 11,837,747 B2
(45) Date of Patent: *Dec. 5, 2023

(54) BATTERY CASE UNLOCKING APPARATUS, BATTERY CASE, AND QUICK BATTERY CASE REPLACEMENT SYSTEM

(71) Applicants: SHANGHAI DIANBA NEW ENERGY TECHNOLOGY CO., LTD., Shanghai (CN); AULTON NEW ENERGY AUTOMOTIVE TECHNOLOGY GROUP, Shanghai (CN)

(72) Inventors: Jianping Zhang, Shanghai (CN); Chunhua Huang, Shanghai (CN); Danliang Qiu, Shanghai (CN)

(73) Assignees: SHANGHAI DIANBA NEW ENERGY TECHNOLOGY CO., LTD., Shanghai (CN); AULTON NEW ENERGY AUTOMOTIVE TECHNOLOGY GROUP, Shanghai (CN)

(*) Notice: Subject to any disclaimer, the term of this patent is extended or adjusted under 35 U.S.C. 154(b) by 121 days.

This patent is subject to a terminal disclaimer.

(21) Appl. No.: 17/507,781

(22) Filed: Oct. 21, 2021

(65) Prior Publication Data
US 2022/0045401 A1 Feb. 10, 2022

Related U.S. Application Data

(63) Continuation of application No. 16/958,758, filed as application No. PCT/CN2018/125682 on Dec. 29, 2018, now Pat. No. 11,183,731.

(30) Foreign Application Priority Data

Dec. 29, 2017 (CN) .......................... 201711482887.2

(51) Int. Cl.
*H01M 50/264* (2021.01)
*B60L 53/80* (2019.01)
(Continued)

(52) U.S. Cl.
CPC ............ *H01M 50/264* (2021.01); *B60K 1/04* (2013.01); *B60L 53/80* (2019.02); *E05B 79/12* (2013.01);
(Continued)

(58) Field of Classification Search
CPC ............ H01M 50/264; H01M 50/244; H01M 2220/20; H01M 50/249; H01M 50/262;
(Continued)

(56) References Cited

U.S. PATENT DOCUMENTS 5,953,942 A * 9/1999 Doucet ............... E05B 47/0688
70/277
6,487,884 B1 * 12/2002 Constantinou ........ E05B 47/068
70/279.1
(Continued)

FOREIGN PATENT DOCUMENTS

CN 102529667 * 7/2012 ............... B60K 1/04
CN 102529667 A 7/2012
(Continued)

OTHER PUBLICATIONS

CN 102529667 machine English translation (Year: 2012).*
(Continued)

*Primary Examiner* — Michael L Dignan

(57) ABSTRACT

A battery case unlocking apparatus, a battery case, and a quick battery case replacement system. The battery case unlocking apparatus comprises: a mount (1), an extensible/retractable mechanism (2), a transmission mechanism (3), and a locking mechanism (4). The locking mechanism (4) is used for locking and fixing a body (6) of a battery case to a battery holder (7) of an electric vehicle. The extensible/retractable mechanism (2) passes through the mount (1) and carries out extension/retraction movement in the mount (1) relative to the transmission mechanism (3) to drive the transmission mechanism (3) to move between the extensible/retractable mechanism (2) and the locking mechanism (4), thereby controlling the locking or unlocking of the locking mechanism (4). The battery case comprises the body (6) and the battery case unlocking apparatus. The quick
(Continued)

battery case replacement system comprises: the battery holder (7), a replacement device (8), and the battery case.

21 Claims, 5 Drawing Sheets

(51) Int. Cl.
*B60K 1/04* (2019.01)
*E05B 79/12* (2014.01)
*H01M 50/244* (2021.01)

(52) U.S. Cl.
CPC ... *H01M 50/244* (2021.01); *B60K 2001/0455* (2013.01)

(58) Field of Classification Search
CPC . H01M 50/20; B60K 1/04; B60K 2001/0455; B60L 53/80; B60L 50/64; E05B 78/12; Y02E 60/10; Y02T 10/70; Y02T 10/7072; B60S 5/06
See application file for complete search history.

(56) References Cited

U.S. PATENT DOCUMENTS

| | | | | |
|---|---|---|---|---|
| 10,648,197 | B2* | 5/2020 | Zheng | E05B 47/0657 |
| 2015/0037625 | A1* | 2/2015 | Wen | B60L 50/64 |
| | | | | 429/96 |
| 2015/0063897 | A1* | 3/2015 | Poillot | H01M 50/264 |
| | | | | 403/20 |

FOREIGN PATENT DOCUMENTS

| | | | | |
|---|---|---|---|---|
| CN | 102616216 | * | 8/2012 | B25J 15/06 |
| CN | 103786562 | A | 5/2014 | |
| CN | 205406599 | * | 7/2016 | H01M 2/10 |
| CN | 205601588 | * | 9/2016 | B60K 1/04 |
| JP | 421101 | U | 2/1992 | |
| JP | 2004232375 | A | 8/2004 | |
| JP | 201383135 | A | 5/2013 | |
| KR | 102353252 | B1 | 1/2022 | |

OTHER PUBLICATIONS

CN 102616216 machine English translation (Year: 2012).*
CN 205406599 machine English translation (Year: 2016).*
CN 205601588 machine English translation (Year: 2016).*
Nov. 29, 2022 First Office Action issued in Japanese Patent Application No. 2021-184268.
Jan. 19, 2023 First Office Action issued in Indian Patent Application No. 202228060099.
Jan. 19, 2023 First Office Action issued in Indian Patent Application No. 202228060098.
First Office Action dated May 19, 2022 issued in European Patent Application No. 18895181.8.
First Office Action dated May 12, 2021 issued in Japanese Patent Application No. 2020-536592.
First Office Action dated Aug. 26, 2022 issued in Korean Patent Application No. 10-2022-7001474 X.

* cited by examiner

BATTERY CASE UNLOCKING APPARATUS, BATTERY CASE, AND QUICK BATTERY CASE REPLACEMENT SYSTEM

The present application is a Continuation application of U.S. patent application Ser. No. 16/958,758, now U.S. patent Ser. No. 11/183,731, issued on Nov. 23, 2021, which is a national-phase application of PCT Application No. PCT/CN2018/125682 filed on Dec. 29, 2018, which claims the priority to CN patent application CN201711482887.2 filed on Dec. 29, 2017, which is hereby incorporated herein by reference in its entirety.

FIELD OF INVENTION

The present invention relates to the field of battery case replacement device, in particular to a battery case unlocking apparatus, a battery case and a quick battery case replacement system.

PRIOR ARTS

Due to the shortage of oil resources and people's increasing awareness of environmental protection, the use of electric vehicles is more and more popular, and this has become a trend. In order to cooperate with the use of electric vehicles, the battery replacing station also came into being. In the battery replacing station, the battery case of electric vehicles can be replaced quickly through the battery replacing robot.

In the prior art, the connection mechanism on the battery case for connecting with the replacement device is usually set separately from the locking mechanism on the battery case for locking/unlocking with the holder, and the locking mechanism is usually set on both sides of the battery case, when the battery case and the battery holder are disassembled and separated by the replacement device, the unlocking mechanism of the replacement device unlocks the locking mechanisms on both sides of the battery case respectively to complete the disassembly of the battery case. However, in practical, the unlocking mechanism of the replacement device and the locking mechanism of the battery case use the way of hard contact to unlock, this way tends to cause wear of the parts in the unlocking mechanism and the locking mechanism, and complex alignment operation is required, the unlocking accuracy is poor, and incomplete unlocking may occur, which causes problem of the replacement device unable to pull the battery case out, and this also affects the efficiency of the replacement device to a certain extent.

CONTENT OF THE PRESENT INVENTION

The technical problem to be solved in the present invention is for overcoming the defect that locking components and unlocking components can be easily damaged during the unlocking of battery case as well as the poor accuracy of unlocking in the prior art, hence providing a battery case unlocking apparatus, a battery case and a quick battery case replacement system.

The present invention solves the above-mentioned technical problem through the following technical solutions:

A battery case unlocking apparatus comprises: a mount, an extensible/retractable mechanism, a transmission mechanism and a locking mechanism; the locking mechanism is used for locking and fixing a body of the battery case to a battery holder of an electric vehicle; the extensible/retractable mechanism passes through the mount and carries out extension/retraction movement in the mount relative to the transmission mechanism under an unlocking external force; the transmission mechanism is connected with the extensible/retractable mechanism at one end, and the other end of the transmission mechanism is connected with the locking mechanism; the extension/retraction movement of the extensible/retractable mechanism drives the transmission mechanism to move between the extensible/retractable mechanism and the locking mechanism, and the movement of the transmission mechanism controls the locking or unlocking of the locking mechanism.

Preferably, among the battery case unlocking apparatus in present invention, the transmission mechanism comprises an active pole, a driven pole, a connecting rod, a driving rod and a guiding part; the active pole is connected with the extensible/retractable mechanism, the driven pole is connected with one end of the driving rod, the connecting rod is connected with the active pole and the driven pole respectively, the connecting rod may rotate around the axis of the active pole, and the connecting rod may rotate around the axis of the driven pole; the other end of the driving rod is connected with the locking mechanism; the guiding part is provided with a driven guiding hole extending along the moving direction of the driving rod, and the driven pole passes through the driven guiding hole and slides in the driven guiding hole. Through this preferred embodiment, the extensible/retractable mechanism is used to drive the movement of the active pole, the active pole and driven pole are linked through connecting rod, the driven pole moves along the guiding part on both sides of the active pole in different directions from the moving direction of the active pole, the longitudinal moment of the active pole is converted into the transverse moment of the driving rod, and the transverse movement of the driven pole is led by the guiding part, so that the linkage effect of the transmission mechanism is more accurate and smooth, and the space inside the battery case is saved.

Preferably, the guiding part is provided with an active guiding hole extending along the extending/retracting direction of the extensible/retractable mechanism, the active pole passes through the active guiding hole and slides in the active guiding hole. Through this preferred embodiment, during the process of pushing and pulling the active pole by the extensible/retractable mechanism 2, the movement of the active pole is always in the same straight line, so as to avoid the force loss in the moment transfer process and improve the energy utilization efficiency.

Preferably, among the battery case unlocking apparatus in present invention, the guiding part is provided with a driving guiding hole, and the driving rod passes through the driving guiding hole and moves in the driving guiding hole. Through this preferred embodiment, shaking and displacement in other directions during the process of pushing and pulling of the driving rod are avoided.

Preferably, among the battery case unlocking apparatus in present invention, the driving rod comprises an active pull rod, a first reset spring and a driven pull rod, and the active pull rod is connected with the driven pole, the active pull rod is connected with the driven pull rod, the driven pull rod is connected with the locking mechanism, the first reset spring is sleeved outside the active pull rod, one end of the first reset spring is connected with the guiding part, and the other end of the first reset spring is connected with the active pull rod. Through this preferred embodiment, the first reset spring is used to store the moment transferred to the active pull rod, and then the moment is released to the active pull rod to make it return to the initial position by the restoring force generated by the compression of the first reset spring, so that when the next unlocking action is carried out, the extensible/retractable mechanism, the active pull rod, the driven pull rod and the locking mechanism can be in the initial position so as to conduct the next unlocking.

Preferably, among the battery case unlocking apparatus in present invention, the extensible/retractable mechanism comprises an extensible/retractable rod and a hollow shaft, the mount is sleeved outside the hollow shaft, the extensible/retractable rod passes through the hollow shaft and is capable of performing extension/retraction movement in the hollow shaft, and the extensible/retractable rod is connected with one end of the transmission mechanism. Through this preferred embodiment, the hollow shaft is sleeved outside the extensible/retractable rod, so that the extensible/retractable rod can receive protection and guiding from the hollow shaft during extensible/retractable movement without bending to damage the extensible/retractable rod or the direction of extensible/retractable movement departing from the axis of the extensible/retractable rod.

Preferably, among the battery case unlocking apparatus in present invention, the hollow shaft is provided with a secondary leading hole, the secondary leading hole extends along the extending/retracting direction of the extensible/retractable rod, one end of the transmission mechanism passes through and is capable of sliding along the secondary leading hole, and the connection location between one end of the transmission mechanism and the extensible/retractable rod is located in the hollow shaft. Through this preferred embodiment, the active pole located at one end of the transmission mechanism may move in the hollow shaft and be protected and guided by the hollow shaft, as well as save space.

Preferably, among the battery case unlocking apparatus in present invention, one end of the hollow shaft away from the mount is connected with a fixed base, a second reset spring is sleeved outside the hollow shaft, one end of the second reset spring is connected with the fixed base, and the other end of the second reset spring is connected with one end of the transmission mechanism. Through this preferred embodiment, the transmission mechanism can automatically reset through the restoring force of the second reset spring after completing the force transfer of unlocking, so as to quickly link up the next unlocking action.

Preferably, among the battery case unlocking apparatus in present invention, the extensible/retractable rod comprises a pressing part and a transmission shaft, the transmission shaft passes through the hollow shaft, the pressing part passes through one end of the mount away from the hollow shaft, the transmission shaft is connected with one end of the transmission mechanism, and the pressing part is abutting against the end part at the end of the transmission shaft away from the transmission mechanism. Through this preferred embodiment, the extensible/retractable rod uses a two-stage structure, which gives the extensible/retractable rod a certain "bending" space, that is, the pressing part can allow a tiny displacement for transmission shaft relative to the transmission shaft in the radial direction of the transmission shaft, so as to avoid the bending problem of the integral extensible/retractable rod due to the relative displacement between the two parts when it passes through the two parts.

Preferably, among the battery case unlocking apparatus in present invention, the pressing part comprises a button, a flange, a concave part and a butting pole, the concave part is arranged at one end of the button close to the transmission shaft, the flange is arranged around the concave part, and the butting pole passes through the button and is abutting against the transmission shaft. Through this preferred embodiment, using the cooperation of the flange and the second reset spring, the extensible/retractable rod is located firmly in the mount and the hollow shaft, and the extensible/retractable rod will not pop out of the mount due to the restoring force from the second reset spring.

Preferably, among the battery case unlocking apparatus in present invention, the locking mechanism comprises a locking box and a linkage part, a locking bracket, a retaining locking tongue and a main locking tongue arranged within the locking box; the linkage part is connected with one end of the transmission mechanism away from the extensible/retractable mechanism; one end of the retaining locking tongue is fixed at the locking box, the other end of the retaining locking tongue may stretch out the locking box elastically; the locking bracket is clamped on the linkage part, the locking bracket is connected with the retaining locking tongue, the movement of the transmission mechanism drives the linkage part and makes the locking bracket extend/retract along the extending/retracting direction of the retaining locking tongue; the main locking tongue is connected with the locking bracket, and the extending/retracting movement of the locking bracket drives the main locking tongue stretches out or retract from the locking box. Through this preferred embodiment, when the linkage part transmits the unlocking external force of the transmission mechanism to the main locking tongue, the main locking tongue returns to unlock, at this time, the retaining locking tongue acts as an energy storage part to store the force, when the linkage part suffers no external force, the retaining locking tongue releases the stored force and pushes the linkage part away, and drives the main locking tongue to pop out the locking box through the locking bracket, therefore the whole unlocking and resetting action is fast and accurate.

Preferably, among the battery case unlocking apparatus in present invention, the linkage part comprises an unlocking push rod, an unlocking swing rod and a locking swing rod; the unlocking push rod is connected with one end of the transmission mechanism and moves along the moving direction of the transmission mechanism; the unlocking swing rod is connected with the unlocking push rod, the unlocking swing rod is pin-jointed with a swing shaft fixed on the locking box, the movement of the unlocking push rod drives the unlocking swing rod to swing around the swing shaft; one end of the locking swing rod is pin-jointed with a spin shaft fixed on the locking box, and the other end of the locking swing rod is arranged at one end of the unlocking swing rod away from the unlocking push rod; the locking bracket is clamped on one end of the locking swing rod away from the unlocking swing rod, and the locking swing rod rotates about the spin shaft and drives the locking bracket to move along the extending/retracting direction of the retaining locking tongue. Through this preferred embodiment, using the unlocking swing rod and the locking swing rod to transfer the unlocking force received by the unlocking push rod to the retaining locking tongue precisely.

Preferably, among the battery case unlocking apparatus in present invention, a locking piece is fixed on the locking bracket, the locking piece is provided with a sliding jaw and a stop jaw, the sliding jaw is linked with the stop jaw, the retaining locking tongue is provided with a sliding slope, and the sliding jaw slides along the sliding slope to drive the stop jaw to enter or exit a retracting path of the main locking tongue. Through this preferred embodiment, controlling the stop jaw by the sliding jaw, when the main locking tongue is in locked state, the stop jaw plays the role of stopping the main locking tongue.

Preferably, among the battery case unlocking apparatus in present invention, the locking box is also provided with a safety shaft, the safety shaft passes through the locking box and stretches out the locking box, the safety shaft may extend or retract along the axis direction, the safety shaft rotates from an unlock position to a lock position by self-rotation, the safety shaft is provided with a locking pole, and. when the safety shaft rotates to the lock position, the main locking tongue stretches out of the locking box, and the locking pole is against the back end of the main locking tongue. Through this preferred embodiment, the safety shaft is used to cooperate with the structure of the aforementioned locking mechanism, which makes the operation of the locking mechanism simple, convenient, high safety performance and intelligent, moreover, in the secondary locking state, all wrong operations from external forces will not affect the locking state.

Preferably, among the battery case unlocking apparatus in present invention, the safety shaft is provided with an induction pole, the locking box is provided with a sensor, the sensor is used for detecting the position of the induction pole, and when the safety shaft rotates to the lock position, the sensor is facing the induction pole directly. Through this preferred embodiment, the sensors are used to provide signals that enable users to clearly distinguish whether the locking mechanism is in unlocked or locked state.

Preferably, among the battery case unlocking apparatus in present invention, a pressing plate is fixed on the inner surface of the locking box away from the body of the battery case, the pressing plate is provided with an unlock position and a lock position, the safety shaft is provided with a block pole, the block pole rotates along with the safety shaft and is used for switching between the unlock position and lock position. Through this preferred embodiment, the reliability of the secondary insurance of the safety shaft is improved.

Preferably, among the battery case unlocking apparatus in present invention, the battery case unlocking apparatus also comprises a housing, the transmission mechanism and the locking mechanism are arranged within the housing, and the mount and the extensible/retractable mechanism are extensible/retractable arranged along the extending or retracting direction of the extensible/retractable mechanism in the housing. Through this preferred embodiment, avoiding the transmission mechanism and locking mechanism exposed to protect the transmission mechanism and locking mechanism from damage.

Preferably, among the battery case unlocking apparatus in present invention, the mount comprises an electromagnetic chuck, the electromagnetic chuck is sleeved outside one end of the extensible/retractable mechanism away from the transmission mechanism. Through this preferred embodiment, using electromagnet to electrify can easily make attracting connection of the battery case and external equipment, showing a high degree of automation and intelligence.

A battery case, it comprises: a body; a battery case unlocking apparatus; the mount is arranged at one side of the extensible/retractable mechanism away from the body, the extensible/retractable mechanism and the transmission mechanism are arranged at the end part of the body, the locking mechanism is arranged at the side part of the body; the extensible/retractable mechanism perform extending or retracting movement relative to the end part of the body, and the transmission mechanism moves along the end part of the body.

Preferably, among the battery case in present invention, the number of the locking mechanisms is two, the two locking mechanism are relatively arranged at two side parts of the body; the number of the transmission mechanisms is two, the two transmission mechanism are located at two sides of the extensible/retractable mechanism respectively; the extensible/retractable mechanism drives the two locking mechanisms to lock or unlock through the two transmission mechanisms simultaneously. Through this preferred embodiment, the battery case unlocking apparatus instead of being separated on either side of the battery case in the prior art, it is changed to an integrated point of the unlocking point and power point, which simplifies the function point and fault point of the battery case, and improves the unlocking precision and success rate when using external devices to unlock the battery case.

A quick battery case replacement system, it comprises: a battery holder, a replacement device and a battery case; the battery holder is provided with a locking part, the locking mechanism is in locking coordination with the locking part; the replacement device comprises a replacement device chuck and an unlocking rod which extensible or retractable passes through the replacement device chuck, the unlocking rod is arranged corresponding to the extensible/retractable mechanism, the stretching movement of the unlocking rod is used to push the extensible/retractable mechanism to retract, drive the locking mechanism and the locking part to unlock, and the replacement device is connected to the battery case through the attracting of the replacement device chuck and the mount.

The above-mentioned preferred conditions may be combined randomly on the basis of conforming to the general knowledge in the field to obtain each preferred embodiment of the present invention.

The present invention has the following positive improvement effects:

The battery case unlocking apparatus, a battery case, and a quick battery case replacement system provided in the present invention using the transmission mechanism to transfer the torque generated by the extensible/retractable movement of the extensible/retractable mechanism under the unlocking external force to the locking mechanism, this integrates multiple functional parts onto one and the same battery case, implementing one point of action, multi-point unlocking, which is capable of achieving automatic unlocking and locking, and the mechanical structure is simplified, safe and reliable, the linkage effect is correct, the unlocking accuracy is high, and the problem of damaged locking and unlocking parts caused by hard connections of the unlocking device and the locking mechanism located on two sides is avoided.

Figure 1:
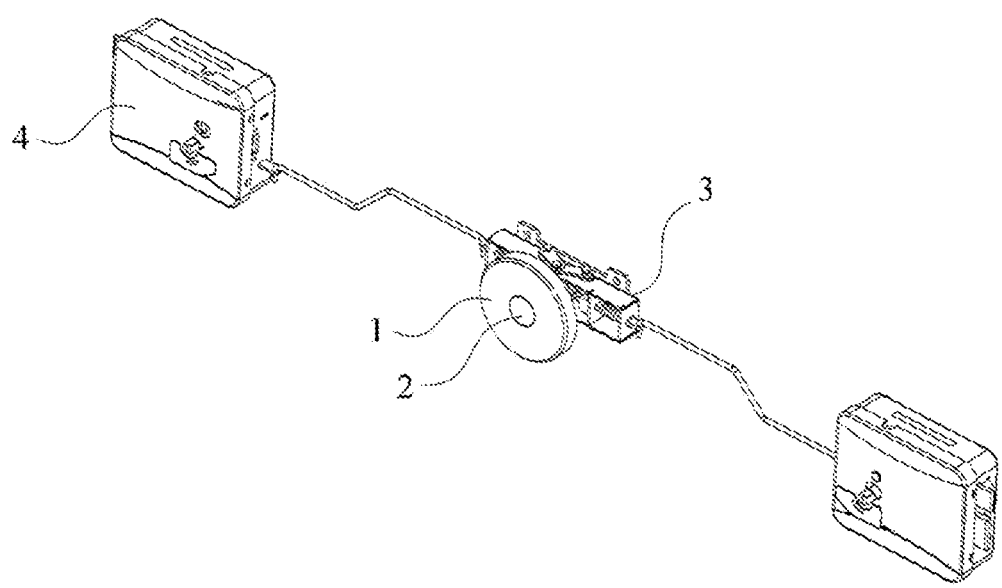
FIG. 1 is a three dimensional diagram of a battery case unlocking apparatus of one embodiment of the present invention.
Figure 2:
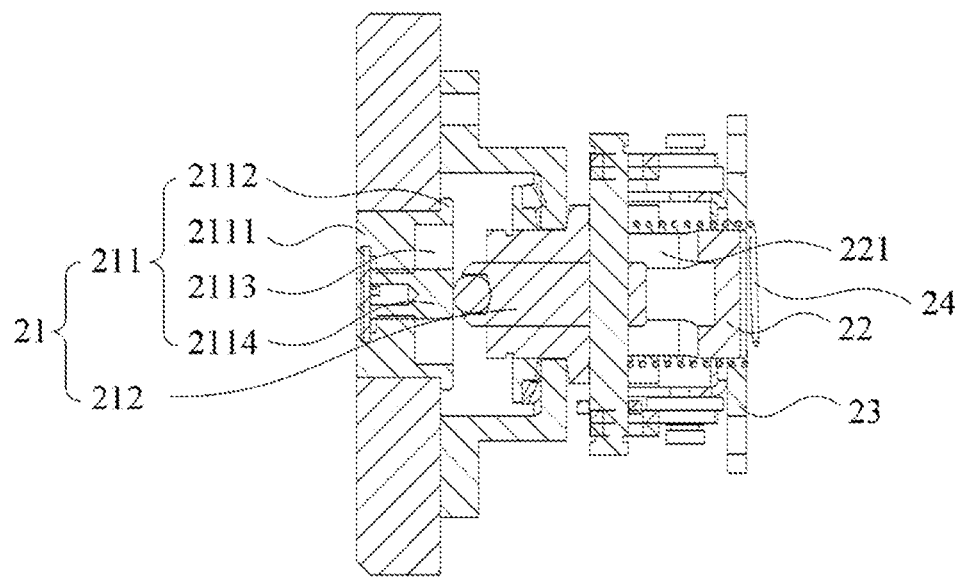
FIG. 2 is a schematic diagram of an extensible/retractable mechanism in the battery case unlocking apparatus of one embodiment of the present invention.
Figure 3:
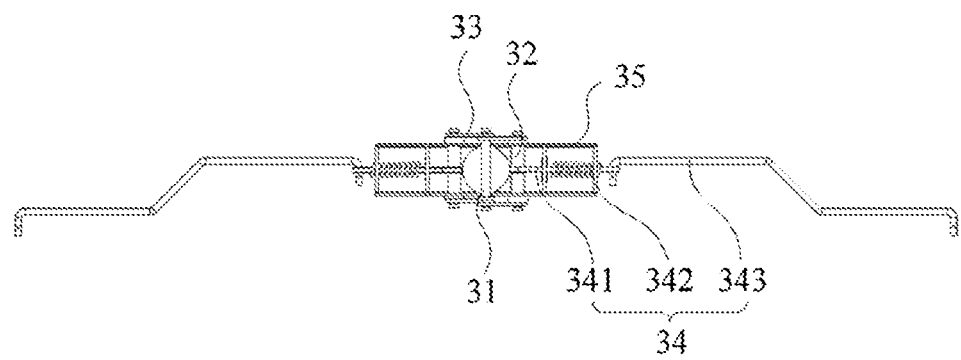
FIG. 3 is a schematic diagram of a transmission mechanism in the battery case unlocking apparatus of one embodiment of the present invention.
Figure 4:
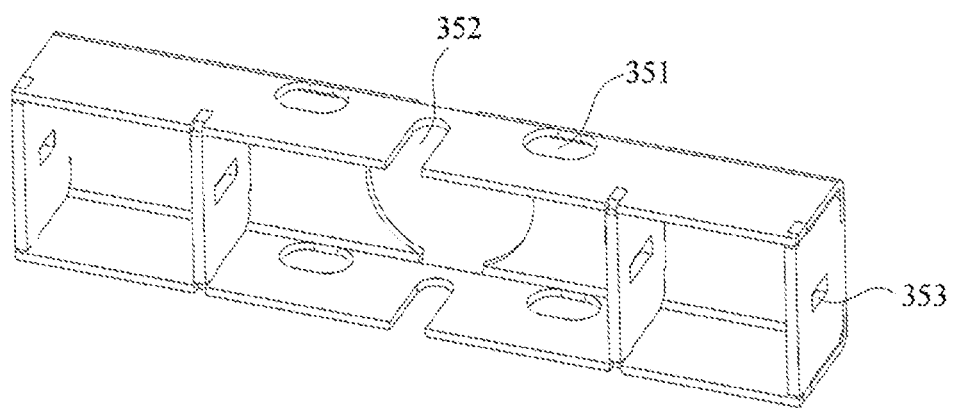
FIG. 4 is a schematic diagram of a guiding part in the battery case unlocking apparatus of one embodiment of the present invention.
Figure 5:
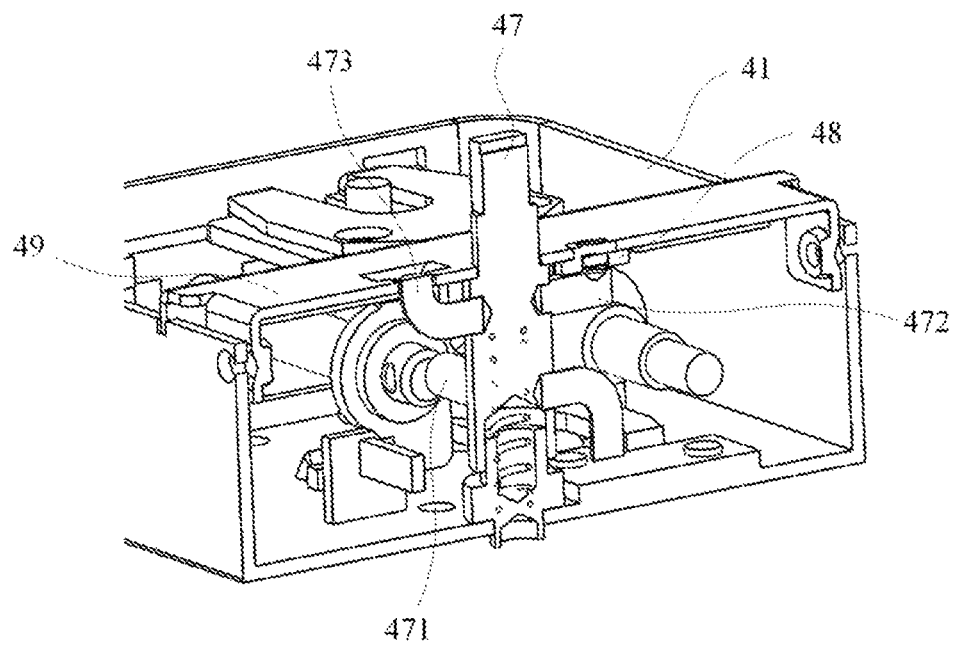
FIG. 5 is an interior schematic diagram of a locking mechanism in the battery case unlocking apparatus of one embodiment of the present invention.
Figure 6:
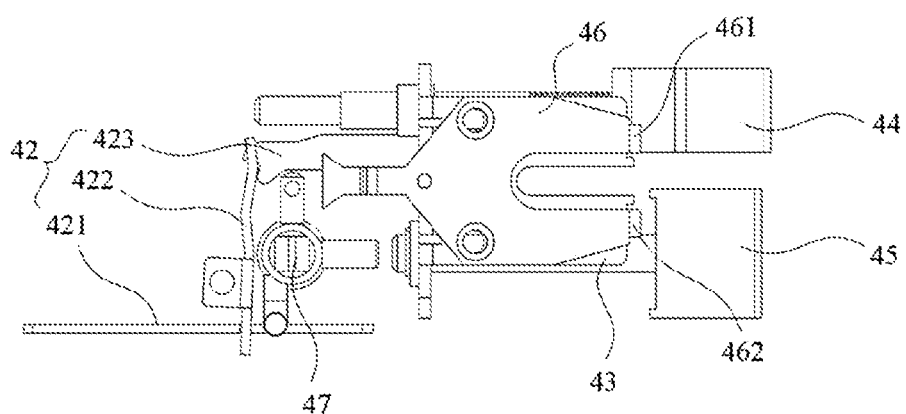
FIG. 6 is a connection schematic diagram of a locking mechanism in the battery case unlocking apparatus of one embodiment of the present invention.

DESCRIPTION OF ATTACHED DRAWINGS mount 1; extensible/retractable mechanism 2; extensible/retractable rod 21; pressing part 211; button 2111; flange 2112; concave part 2113; butting pole 2114; transmission shaft 212; hollow shaft 22; secondary leading hole 221; fixed base 23; second reset spring 24; transmission mechanism 3; active pole 31; driven pole 32; connecting rod 33; driving rod 34; active pull rod 341; first reset spring 342; driven pull rod 343; guiding part 35; driven guiding hole 351; Active guiding hole 352; driving guiding hole 353; locking mechanism 4; locking box 41; linkage part 42; unlocking push rod 421; unlocking swing rod 422; locking swing rod 423; locking bracket 43; retaining locking tongue 44; main locking tongue 45; locking piece 46; sliding jaw 461; stop jaw 462; safety shaft 47; locking pole 471; induction pole 472; block pole 473; sensor 48; pressing plate 49; housing 5; body 6; battery holder 7; locking part 71; replacement device 8; replacement device chuck 81; unlocking rod 82

DETAILED DESCRIPTION OF THE PREFERRED EMBODIMENT

Below presents preferred embodiments of the present invention based on the drawings in order to illustrate the technical schemes of the present invention in detail.

In the description of the invention, it should be understood that the direction or position relations of the terms "up", "down", "front", "back", "left", "right", "straight", "horizontal", "top", "bottom", "inside", "outside" and other indications are based on the direction or position relations shown in the drawings, only for the convenience of describing the invention and simplifying the description, rather than indicating or implying the devices or the elements must have a specific orientation, be constructed and operated in a specific orientation, and therefore cannot be understood as a limitation of the invention.

As FIG. 1-6 shown, an embodiment of present invention disclosed a battery case unlocking apparatus comprises: a mount 1, an extensible/retractable mechanism 2, a transmission mechanism 3 and a locking mechanism 4; the locking mechanism 4 is used for locking and fixing a body 6 of the battery case to a battery holder 7 of an electric vehicle; the extensible/retractable mechanism 2 passes through the mount 1 and carries out extension/retraction movement in the mount 1 relative to the transmission mechanism 3 under an unlocking external force; the transmission mechanism 3 is connected with the extensible/retractable mechanism 2 at one end, the other end of the transmission mechanism 3 is connected with the locking mechanism 4; the extension/retraction movement of the extensible/retractable mechanism 2 drives the transmission mechanism 3 to move between the extensible/retractable mechanism 2 and the locking mechanism 4, and the movement of the transmission mechanism 3 controls the locking or unlocking of the locking mechanism 4.

Specifically, in the hybrid electric vehicle, when the battery power is insufficient and needs to be replaced, it needs to use external equipment to unlock the battery case quickly, therefore, the battery case also needs to be equipped with corresponding unlocking apparatus to achieve the purpose of quick unlocking, in the prior art, the external device corresponding to the battery case unlocking apparatus on both sides presses the body 6 of the battery case from both sides to separate it from the battery holder 7, the power change time is usually about 10 minutes, and the power change time is quite long. In the battery case unlocking apparatus of this embodiment, compared with the previously used battery case unlocking apparatus, the overall structure of the device is compact, the volume is not huge, and the action is sensitive, the most important thing is that the power change time is less than six minutes, and the efficiency is nearly doubled. In the battery case unlocking apparatus in this embodiment, under the effect of unlocking external force, the extensible/retractable mechanism 2 performs extensible/retractable movement relative to the body 6 of the battery case in the mount 1, drives the transmission mechanism 3 to push and pull toward the two sides of the extensible/retractable mechanism 2 along the surface of the body 6 of the battery case, and finally drives the locking mechanism 4 and the battery holder 7 to lock or unlock, the extensible/retractable mechanism 2 transfers the unlocking external force to the transmission mechanism 3, and the transmission mechanism 3 transfers the unlocking external force to the locking mechanism 4, through the linkage mechanism of one point controlling multi-point locking and unlocking, the automatic and intelligent unlocking and locking control is implemented, and the mechanical structure is simplified, safe and reliable, and the linkage effect is correct.

In the battery case unlocking apparatus of this embodiment, the transmission mechanism 3 comprises an active pole 31, a driven pole 32, a connecting rod 33, a driving rod 34 and a guiding part 35; the active pole 31 is connected with the extensible/retractable mechanism 2. The driven pole 32 is connected with one end of the driving rod 34, the connecting rod 33 is connected with the active pole 31 and the driven pole 32 respectively, the connecting rod 33 may rotate around the axis of the active pole 31, and the connecting rod 33 may rotate around the axis of the driven pole 32; the other end of the driving rod 34 is connected with the locking mechanism 4; the guiding part 35 is provided with a driven guiding hole 351 extending along the moving direction of the driving rod 34, and the driven pole 32 passes through the driven guiding hole 351 and slides in the driven guiding hole 351. Specifically, the transmission mechanism 3 is a core component, to implement the purpose of the invention, in the unlocking apparatus of the replacement device 8 of this embodiment, the structure of the transmission mechanism 3 includes five components, wherein the active pole 31 is driven by the extensible/retractable mechanism 2, which generates the force relative to the body 6 direction of the battery case through extensible/retractable movement, the active pole 31 moves along with the extensible/retractable movement, the driven pole 32 is driven to move along the driven guiding hole 351 on the guiding part 35 towards both sides of the active pole 31 by the connecting rod 33. At this time, the force generated by the driving pole relative to the body 6 direction of the battery case is transferred by the two rotating movements of relative to the active pole 31 and driven pole 32 by the connecting rod 33, in this embodiment, the guide part is a frame structure, and the driven guiding hole 351 is arranged on the frame structure, and the driven pole 32 passes through the driven guiding hole 351 and moves on frame structure along the driven guiding hole 351. Through this preferred embodiment, extensible/retractable mechanism 2 is used to drive the motion of active pole 31, the active pole 31 and the driven pole 32 are linked through the connecting rod 33, the driven pole 32 moves along the guiding part 35 on both sides of the active pole 31 in different directions from the moving direction of the active pole 31, the longitudinal moment of the active pole 31 is converted into the transverse moment of the driving rod 34, and the transverse movement of the driven pole 32 is led by the guiding part 35, so that the linkage effect of the transmission mechanism 3 is more accurate and smooth, and the space inside the battery case is saved.

In the battery case unlocking apparatus of this embodiment, the guiding part 35 is provided with an active guiding hole 352 extending along the extending/retracting direction of the extensible/retractable mechanism 2, the active pole 31 passes through the active guiding hole 352 and slides in the active guiding hole 352. Specifically, in the direction different from the driven guiding hole 351, an active guiding hole 352 is arranged on the guiding part 35, and the active pole 31 passes through the active guiding hole 352 and moves in the guiding part 35 along the active guiding hole 352. In this embodiment, it is preferred that the driven guiding hole 351 is closer to the body 6 of the battery case with respect to the active guiding hole 352, the driven guiding hole 351 is arranged on both sides of the active guiding hole 352, and the active guiding hole 352 is perpendicular to the driven guiding hole 351. Through this preferred embodiment, during the process of pushing and pulling the active pole 31 by the extensible/retractable mechanism 2, the movement of the active pole 31 is always in the same straight line, so as to avoid the force loss in the moment transfer process and improve the energy utilization efficiency.

In the battery case unlocking apparatus of this embodiment, the guiding part 35 is provided with a driving guiding hole 353, the driving rod 34 passes through the driving guiding hole 353 and moves in the driving guiding hole 353. Specifically, driving guiding hole 353 is provided on the side of the frame structure of the guiding part 35 and used to guide the driving rod 34 during push and pull movement. Through this preferred embodiment, shaking and displacement in other directions during the process of pushing and pulling of the driving rod 34 are avoided.

In the battery case unlocking apparatus of this embodiment, the driving rod 34 comprises an active pull rod 341, a first reset spring 342 and a driven pull rod 343. The active pull rod 341 is connected with the driven pole 32, the active pull rod 341 is connected with the driven pull rod 343, the driven pull rod 343 is connected with the locking mechanism 4, the first reset spring 342 is sleeved outside the active pull rod 341, one end of the first reset spring 342 is connected with the guiding part 35, and the other end of the first reset spring 342 is connected with the active pull rod 341. Specifically, the driving rod 34 has three parts, the active pole 31 receives the force from the driven pole 32 and forms the push-pull movement, which drives the driven pull rod 343 to perform push-pull movement, the first reset spring 342 absorbs the push-pull force generated by the push-pull movement, so that when the unlocking external force is removed, the first reset spring 342 releases the stored push-pull force and resets the active pull rod 341. Through this preferred embodiment, The first reset spring 342 is used to store the moment transferred to the active pull rod 341, and then the moment is released to the active pull rod 341 to make it return to the initial position by the restoring force generated by the compression of the first reset spring 342, so that when the next unlocking action is carried out, the extensible/retractable mechanism 2, the active pull rod 341, the driven pull rod 343 and the locking mechanism 4 can be in the initial position so as to conduct the next unlocking.

In the battery case unlocking apparatus of this embodiment, the extensible/retractable mechanism 2 comprises an extensible/retractable rod 21 and a hollow shaft 22, the mount 1 is sleeved outside the hollow shaft 22, the extensible/retractable rod passes through the hollow shaft 22 and is capable of performing extension/retraction movement in the hollow shaft 22, and the extensible/retractable rod 21 is connected with one end of the transmission mechanism 3. Specifically, the hollow shaft 22 passes through the frame structure of the guiding part 35 and the extensible/retractable rod 21 passes through the hollow shaft 22, and when applying unlocking external force, the extensible/retractable rod 21 performs extensible/retractable movement and the hollow shaft 22 remains still. Through this preferred embodiment, a hollow shaft 22 is sleeved outside the extensible/retractable rod 21, so that the extensible/retractable rod 21 can receive protection and guiding from the hollow shaft 22 during extensible/retractable movement without bending to damage the extensible/retractable rod 21 or the direction of extensible/retractable movement departing from the axis of the extensible/retractable rod 21.

In the battery case unlocking apparatus of this embodiment, the hollow shaft 22 is provided with a secondary leading hole 221, and the secondary leading hole 221 extends along the extending/retracting direction of the extensible/retractable rod 21, one end of the transmission mechanism 3 passes through and is capable of sliding along the secondary leading hole 221, and the connection location between one end of the transmission mechanism 3 and the extensible/retractable rod 21 is located in the hollow shaft 22. Specifically, the hollow shaft 22 is provided with secondary leading hole 221 corresponding to the guiding hole on the active pole 31, the active pole 31 located at one end of the transmission mechanism 3 passes through guiding hole of active pole 31 on the frame structure of the guiding part 35 and the secondary leading hole 221 of the hollow shaft 22 successively, as well as performs extensible/retractable movement along with the extensible/retractable rod 21. Through this preferred embodiment, the active pole 31 located at one end of the transmission mechanism 3 may move in the hollow shaft 22 and be protected and guided by the hollow shaft 22, as well as save space.

In the battery case unlocking apparatus of this embodiment, one end of the hollow shaft 22 away from the mount 1 is connected with a fixed base 23, a second reset spring 24 is sleeved outside the hollow shaft 22, one end of the second reset spring 24 is connected with the fixed base 23, and the other end of the second reset spring 24 is connected with one end of the transmission mechanism 3. Specifically, when the mount 1 is applied with an external force, it will push the hollow shaft 22 to move axially, so a second reset spring 24 is required to ensure that the hollow shaft 22 and mount 1 can return to their original position when the external force is removed, so as to avoid affecting the later unlocking action. Through this preferred embodiment, the transmission mechanism 3 can automatically reset through the restoring force of the second reset spring 24 after completing the force transfer of unlocking, so as to quickly link up the next unlocking action.

In the battery case unlocking apparatus of this embodiment, the extensible/retractable rod 21 comprises a pressing part 211 and a transmission shaft 212, and the transmission shaft 212 passes through the hollow shaft 22, the pressing part passes through one end of the mount 1 away from the hollow shaft 22, the transmission shaft 212 is connected with one end of the transmission mechanism 3, and the pressing part is abutting against the end part at the end of the transmission shaft 212 away from the transmission mechanism 3. Specifically, it is inevitable that the extensible/retractable rod 21 will be bent due to its length and thickness after repeating the steps of hundreds of times of extensible/retractable movement, therefore, in this embodiment, the extensible/retractable rod 21 has the two-part structure of pressing part 211 and transmission shaft 212, the pressing part 211 and transmission shaft 212 are not fixedly connected, but the structure is stable by pushing the pressing part 211 abutting against the mount 1 through the transmission shaft 212. Through this preferred embodiment, the extensible/retractable rod 21 uses a two-stage structure, which gives the extensible/retractable rod 21 a certain "bending" space, that is, the pressing part can allow a tiny displacement for transmission shaft 212 relative to the transmission shaft in the radial direction of the transmission shaft 212, so as to avoid the bending problem of the integral extensible/retractable rod 21 due to the relative displacement between the two parts when it passes through the two parts.

In the battery case unlocking apparatus of this embodiment, the pressing part 211 comprises a button 2111, a flange 2112, a concave part 2113 and a butting pole 2114, the concave part 2113 is arranged at one end of the button 2111 close to the transmission shaft 212, the flange 2112 is arranged around the concave part 2113, and the butting pole 2114 passes through the button 2111 and is abutting against the transmission shaft 212. Specifically, the restoring force of the second reset spring 24 may cause the pressing part 211 to be ejected from the mount 1, thus affecting the next unlocking action, at the same time, when the pressing part 211 is pushed in by the unlocking external force, the extensible/retractable movement may be limited due to the existence of the hollow shaft 22, therefore, the pressing part 211 includes four parts, the button 2111 is used to receive the unlocking external force, and the flange 2112 is used to prevent the pressing part 211 from ejecting from the mount 1, and the concave part 2113 is used to contain the hollow shaft 22 to extend the expansible/retractable distance of the pressing part 211, and the butting pole 2114 is used to drive the transmission shaft 212 extend or retract. Through this preferred embodiment, using the cooperation of the flange 2112 and the second reset spring 24, the extensible/retractable rod 21 is located firmly in the mount 1 and the hollow shaft 22, and the extensible/retractable rod 21 will not pop out of the mount 1 due to the restoring force from the second reset spring 24.

In the battery case unlocking apparatus of this embodiment, the locking mechanism 4 comprises a locking box 41 and a linkage part 42, a locking bracket 43, a retaining locking tongue 44 and a main locking tongue 45 arranged within the locking box 41; the linkage part 42 is connected with one end of the transmission mechanism 3 away from the extensible/retractable mechanism 2; one end of the retaining locking tongue 44 is fixed at the locking box 41, the other end of the retaining locking tongue 44 may stretch out the locking box 41 elastically; the locking bracket 43 is clamped on the linkage part 42; The locking bracket 43 is connected with the retaining locking tongue 44, the movement of the transmission mechanism 3 drives the linkage part 42 and makes the locking bracket 43 extend/retract along the extending/retracting direction of the retaining locking tongue 44; the main locking tongue 45 is connected with the locking bracket 43. The extending/retracting movement of the locking bracket 43 drives the main locking tongue 45 stretches out or retract from the locking box 41. When the linkage part 42 transmits the unlocking external force of the transmission mechanism 3 to the main locking tongue 45, the main locking tongue 45 returns to unlock, at this time, the retaining locking tongue 44 acts as the energy storage part to store the force, when the linkage part 42 suffers no external force, the retaining locking tongue 44 releases the stored force and pushes the linkage part 42 away, and drives the main locking tongue 45 to pop out the locking box 41 through the locking bracket 43, therefore the whole unlocking and resetting action is fast and accurate.

In the battery case unlocking apparatus of this embodiment, the linkage part 42 comprises an unlocking push rod 421, an unlocking swing rod 422 and a locking swing rod 423. The unlocking push rod 421 is connected with one end of the transmission mechanism 3 and moves along the moving direction of the transmission mechanism 3. The unlocking swing rod 422 is connected with the unlocking push rod 421. The unlocking swing rod 422 is pin-jointed with a swing shaft fixed on the locking box 41. The movement of the unlocking push rod 421 drives the unlocking swing rod 422 to swing around the swing shaft. One end of the locking swing rod 423 is pin-jointed with a spin shaft fixed on the locking box 41. The other end of the locking swing rod 423 is arranged at one end of the unlocking swing rod 422 away from the unlocking push rod 421. The locking bracket 43 is clamped on one end of the locking swing rod 423 away from the unlocking swing rod 422. The locking swing rod 423 rotates about the spin shaft and drives the locking bracket 43 to move along the extending/retracting direction of the retaining locking tongue 44, thus using the unlocking swing rod 422 and the locking swing rod 423 to transfer the unlocking force on the unlocking push rod 421 to the retaining locking tongue 44 precisely.

In the battery case unlocking apparatus of this embodiment, a locking piece 46 is fixed on the locking bracket 43. The locking piece 46 is provided with a sliding jaw 461 and a stop jaw 462. The sliding jaw 461 is linked with the stop jaw 462. The retaining locking tongue 44 is provided with a sliding slope. The sliding jaw 461 slides along the sliding slope to drive the stop jaw 462 to enter or exit the retracting path of the main locking tongue 45. Through this preferred embodiment, controlling the stop jaw 462 by the sliding jaw 461, when the main locking tongue 45 is in locked state, the stop jaw 462 plays the role of stopping the main locking tongue 45.

In the battery case unlocking apparatus of this embodiment, the locking box 41 is also provided with a safety shaft 47. The safety shaft 47 passes through the locking box 41 and stretches out the locking box 41. The safety shaft 47 may extend or retract along the axis direction. The safety shaft 47 rotates from an unlock position to a lock position by self-rotation. The safety shaft 47 is provided with a locking pole 471. When the safety shaft 47 rotates to the lock position, the main locking tongue 45 stretches out of the locking box 41. The locking pole 471 is against the back end of the main locking tongue 45. Through this preferred embodiment, the safety shaft 47 is used to cooperate with the structure of the aforementioned locking mechanism 4, which makes the operation of the locking mechanism 4 simple, convenient, high safety performance and intelligent. Moreover, in the state of secondary locking state, all wrong operations from external forces will not affect the locking state.

In the battery case unlocking apparatus of this embodiment, the safety shaft 47 is provided with an induction pole 472. The locking box 41 is provided with a sensor 48. The sensor 48 is used for detecting the position of the induction pole 472. When the safety shaft 47 rotates to the lock position, the sensor 48 is facing the induction pole 472 directly. Sensor 48s are used to provide signals that enable users to clearly distinguish whether the locking mechanism 4 is in unlocked or locked state In the battery case unlocking apparatus of this embodiment, a pressing plate 49 is fixed on the inner surface of the locking box 41 away from the body 6 of the battery case. The pressing plate 49 is provided with an unlock position and a lock position. The safety shaft 47 is provided with a block pole 473. The block pole 473 rotates along with the safety shaft 47 and is used for switching between the unlock position and lock position. In this embodiment, a pressing plate 49 is fixed on the inner surface of the locking box 41. The sensor 48 is fixed on the inner side of the pressing plate 49, the safety shaft 47 passes through the pressing plate 49 and the locking box 41, the safety shaft 47 can be elastically pressed in or ejected in its axial direction, cooperated with the block pole 473 arranged on the safety shaft 47 to switch between the unlocking position and the locking position, so that the user can carry out manual operation. The reliability of the secondary insurance of safety shaft 47 is improved.

In the battery case unlocking apparatus of this embodiment, the battery case unlocking apparatus also comprises a housing 5. The transmission mechanism 3 and the locking mechanism 4 are arranged within the housing 5. The mount 1 and the extensible/retractable mechanism 2 are extensible/retractable arranged along the extending or retracting direction of the extensible/retractable mechanism 2 in the housing 5. Avoid the transmission mechanism 3 and locking mechanism 4 exposed to protect the transmission mechanism 3 and locking mechanism 4 from damage.

In the battery case unlocking apparatus of this embodiment, the mount 1 comprises an electromagnetic chuck. The electromagnetic chuck is sleeved outside the end of the extensible/retractable mechanism 2 away from the transmission mechanism 3. Specifically, in order to integrate the power point and unlocking point of the battery case, simplify the functional parts and failure points of the battery case, and improve the success rate of operation, an electromagnetic chuck is used as the power point to adsorptive connect with the external power equipment. Through this preferred embodiment, using electromagnet to electrify can easily make attracting connection of the battery case and external equipment, showing a high degree of automation and intelligence.

Figure 7:
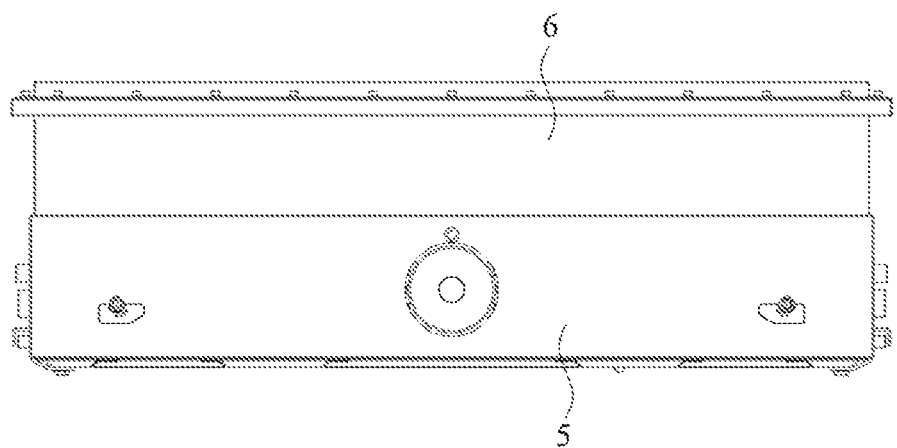
FIG. 7 is a front view of a battery case of one embodiment of the present invention.

As FIG. 7 shown, the present invention disclosed a battery case, it comprises a body 6, a battery case unlocking apparatus. The mount 1 is arranged at one side of the extensible/retractable mechanism 2 away from the body 6. The extensible/retractable mechanism 2 and the transmission mechanism 3 are arranged at the end part of the body 6. The locking mechanism 4 is arranged at the side part of the body 6. The extensible/retractable mechanism 2 perform extending or retracting movement relative to the end part of the body 6. The transmission mechanism 3 moves along the end part of the body 6.

In the battery case of this embodiment, the number of locking mechanism 4s is two. Two locking mechanism 4 are relatively arranged at two side parts of the body 6. The number of transmission mechanism 3s is two. Two transmission mechanism 3 are located at two sides of the extensible/retractable mechanism 2 respectively. The extensible/retractable mechanism 2 drives two locking mechanism 4s to lock or unlock through two transmission mechanism 3s simultaneously. Through this preferred embodiment, battery case unlocking apparatus instead of being separated on either side of the battery case in the prior art, it is changed to an integrated point of the unlocking point and power point, which simplifies the function point and fault point of the battery case, and improves the unlocking precision and success rate when using external devices to unlock the battery case.

Figure 8:
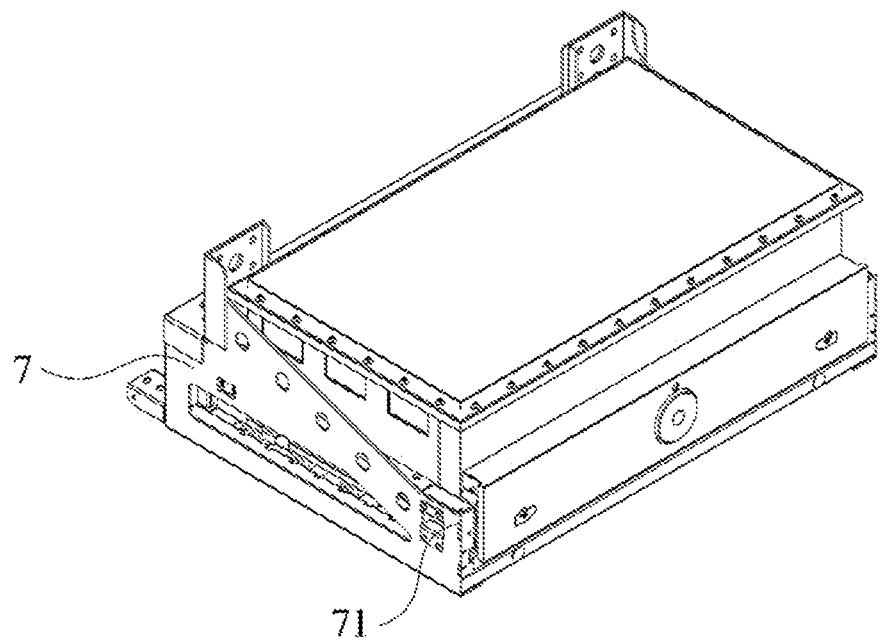
FIG. 8 is a schematic diagram of a battery case and a battery holder during installation of one embodiment of the present invention.
Figure 9:
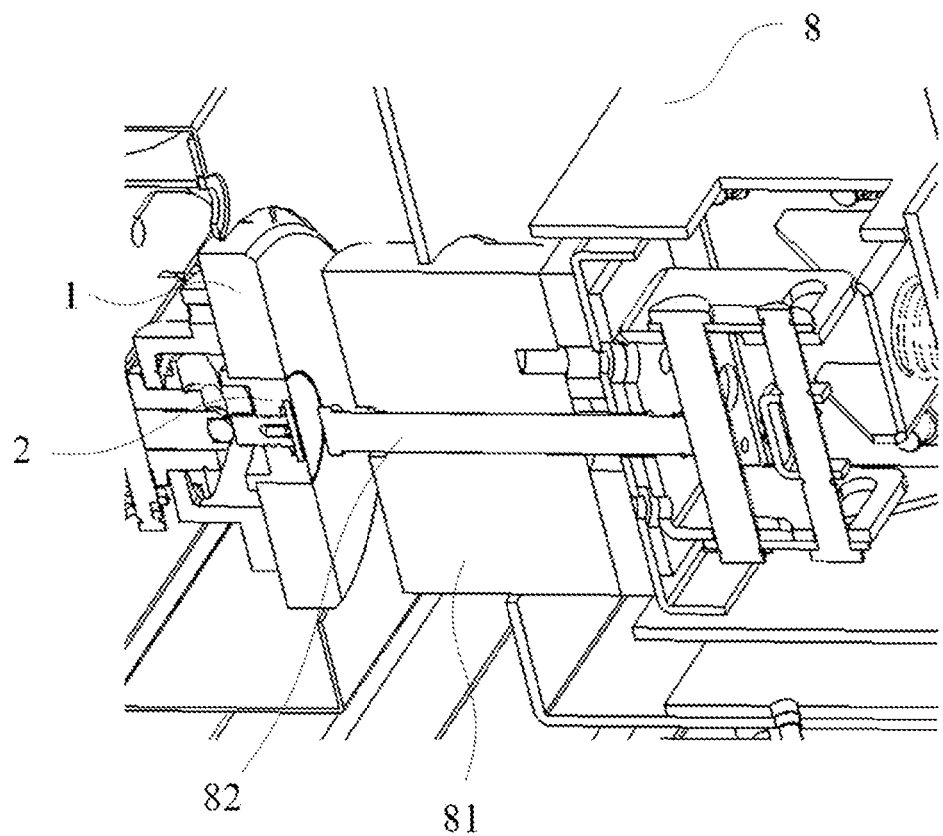
FIG. 9 is an unlocking schematic diagram of a quick battery case replacement system of one embodiment of the present invention.

As FIG. 8 and FIG. 9 shown, the present invention disclosed a quick battery case replacement system, and it comprises a battery holder 7, a replacement device 8 and a battery case; the battery holder 7 is provided with a locking part 71, the locking mechanism 4 is in locking coordination with the locking part 71. The replacement device 8 comprises a replacement device chuck 81 and an unlocking rod 82 which extensible or retractable passes through the replacement device chuck 81. The unlocking rod 82 is arranged corresponding to the extensible/retractable mechanism 2. The stretching movement of the unlocking rod 82 is used to push the extensible/retractable mechanism 2 to retract, drive the locking mechanism 4 and the locking part 71 to unlock. The replacement device 8 is connected to the battery case through the attracting of the replacement device chuck 81 and the mount 1.

The unlocking rod 82 of the replacement device 8 extends to push the extensible/retractable rod 21 in the middle of the mount 1 of the battery case, the extensible/retractable rod 21 drives the active pole 31 to move to the body 6 of battery case for a certain distance, and the active pole 31 pushes the driven pole 32 to move to both sides through the connecting rod 33. In a preferred embodiment, the active pole 31 moves 8 mm, and the driven poles 32 on both sides of the active pole 31 move 4 mm respectively, by changing the direction of motion without changing the thrust, driving the driving rod 34 to push to both sides, then driving the main locking tongue 45 of the locking mechanism 4 to retract, so as to complete the unlocking. When it is necessary to lock the body 6 of the battery case to the battery holder 7, pushing the extensible/retractable rod 21 to reset through manual or control equipment, and pushing the body 6 of the battery case to enter the battery holder 7 evenly, and when it is in place, the locking mechanism 4 of the battery case will lock automatically, the manual or control equipment will rotate the safety shaft 47 for 90 degrees, and the sensor 48 will trigger the safety locking signal to confirm that the locking is in good condition and complete the locking process.

When the body 6 of the battery case is pushed into the battery holder 7, the retaining locking tongue 44 retracts, but maintains a certain pressing force, the main locking tongue 45 extends out to clamp the battery holder 7, and the battery box is in the locking state, when the safety shaft 47 is manually screwed by the user or automatically rotated by the control equipment, as it is twisted by 90 degrees, the locking pole 471 of the safety shaft 47 is against the main locking tongue 45, the safety shaft 47 and the main locking tongue 45 are always lock safely, when the locking pole 471 reaches the designated position, it triggers the sensor 48 to induct and send out effective signals to express the safety locking signal, and the battery case is locked with a second insurance. When replacing the battery case, the safety shaft 47 must be reset manually or by the control equipment, the locking bracket 43 falls down, and the main locking tongue 45 will spring back automatically by using the force stored by the retaining locking tongue 44, then the battery case can exit from the battery holder 7 to implement the unlocking function.

The battery case unlocking apparatus, the battery case, and the quick battery case replacement system provided by the present invention provides, using the transmission mechanism 3 to transfer the torque generated by the extensible/retractable movement of the extensible/retractable mechanism 2 under the unlocking external force to the locking mechanism 4, this integrates multiple functional parts onto one and the same battery case, implementing one point of action, multi-point unlocking, which is capable of achieving automatic unlocking and locking, and the mechanical structure is simplified, safe and reliable, the linkage effect is correct, the unlocking accuracy is high, and the problem of damaged locking and unlocking part 71s caused by hard connections of the unlocking device and the locking mechanism 4 located on two sides is avoided.

Although the specific embodiments of the invention are described above, it should be understood by those skilled in the art that this is only an example, and the scope of protection of the invention is defined by the appended claims. Those skilled in the art can make various changes or modifications to these embodiments without departing from the principles and essence of the invention, but these changes and modifications fall into the scope of protection of the present invention.

The invention claimed is:

1. A battery case unlocking apparatus, wherein, the battery case unlocking apparatus comprises:
    an extensible/retractable mechanism, a transmission mechanism and a locking mechanism;
    the locking mechanism is capable of being used for locking and fixing a body of the battery case to a battery holder of an electric vehicle;
    the extensible/retractable mechanism is capable of extending and retracting movement relative to the transmission mechanism under an unlocking external force;
    the transmission mechanism is connected with the extensible/retractable mechanism at one end, and the other end of the transmission mechanism is connected with the locking mechanism;
    the extension/retraction movement of the extensible/retractable mechanism drives the transmission mechanism to move between the extensible/retractable mechanism and the locking mechanism, and the movement of the transmission mechanism controls the locking or unlocking of the locking mechanism;
    the transmission mechanism comprises an active pole, a driven pole, a connecting rod, a driving rod and a guiding part;
    the active pole is connected with the extensible/retractable mechanism, the driven pole is connected with one end of the driving rod, the connecting rod is connected with the active pole and the driven pole respectively, the connecting rod is configured to rotate around the axis of the active pole and to rotate around the axis of the driven pole;
    the other end of the driving rod is connected with the locking mechanism;
    the extensible/retractable mechanism is used to drive the motion of the active pole, the active pole and the driven pole are linked through the connecting rod, the driven pole moves along the guiding part on both sides of the active pole in different directions from the moving direction of the active pole, the longitudinal moment of the active pole is converted into the transverse moment of the driving rod, and the transverse movement of the driven pole is led by the guiding part; the guiding part is a frame structure,
    the guiding part is provided with an active guiding hole extending along the extending/retracting direction of the extensible/retractable mechanism, the active pole passes through the active guiding hole and slides in the active guiding hole.

2. The battery case unlocking apparatus of claim 1, wherein, the guiding part is provided with a driven guiding hole extending along the moving direction of the driving rod, and the driven pole passes through the driven guiding hole and slides in the driven guiding hole.

3. The battery case unlocking apparatus of claim 2, wherein, the guiding part is provided with a driving guiding hole, and the driving rod passes through the driving guiding hole and moves in the driving guiding hole.

4. The battery case unlocking apparatus of claim 2, wherein, the driving rod comprises an active pull rod, a first reset spring and a driven pull rod, and the active pull rod is connected with the driven pole, the active pull rod is connected with the driven pull rod, the driven pull rod is connected with the locking mechanism, the first reset spring is sleeved outside the active pull rod, one end of the first reset spring is connected with the guiding part, and the other end of the first reset spring is connected with the active pull rod.

5. The battery case unlocking apparatus of claim 1, wherein, the battery case unlocking apparatus comprises a mount, the extensible/retractable mechanism passes through the mount and is capable of extending and retracting movement in the mount relative to the transmission mechanism under an unlocking external force.

6. The battery case unlocking apparatus of claim 5, wherein, the extensible/retractable mechanism comprises an extensible/retractable rod and a hollow shaft, the mount is sleeved outside the hollow shaft, the extensible/retractable rod passes through the hollow shaft and is capable of performing extension/retraction movement in the hollow shaft, and the extensible/retractable rod is connected with one end of the transmission mechanism.

7. The battery case unlocking apparatus of claim 6, wherein, the hollow shaft is provided with a secondary leading hole, the secondary leading hole extends along the extending/retracting direction of the extensible/retractable rod, one end of the transmission mechanism passes through and is capable of sliding along the secondary leading hole, and the connection location between one end of the transmission mechanism and the extensible/retractable rod is located in the hollow shaft.

8. The battery case unlocking apparatus of claim 6 wherein, one end of the hollow shaft away from the mount is connected with a fixed base, a second reset spring is sleeved outside the hollow shaft, one end of the second reset spring is connected with the fixed base, and the other end of the second reset spring is connected with one end of the transmission mechanism.

9. The battery case unlocking apparatus of claim 6, wherein, the extensible/retractable rod comprises a pressing part and a transmission shaft, the transmission shaft passes through the hollow shaft, the pressing part passes through one end of the mount away from the hollow shaft, the transmission shaft is connected with one end of the transmission mechanism, and the pressing part is abutting against the end part at the end of the transmission shaft away from the transmission mechanism.

10. The battery case unlocking apparatus of claim 9, wherein, the pressing part comprises a button, a flange, a concave part and a butting pole, the concave part is arranged at one end of the button close to the transmission shaft, the flange is arranged around the concave part, and the butting pole passes through the button and is abutting against the transmission shaft.

11. The battery case unlocking apparatus of claim 1, wherein:
the locking mechanism comprises a locking box and a linkage part, a locking bracket, a retaining locking tongue and a main locking tongue arranged within the locking box;
the linkage part is connected with one end of the transmission mechanism away from the extensible/retractable mechanism;
one end of the retaining locking tongue is fixed at the locking box, the other end of the retaining locking tongue is configured to stretch out the locking box elastically;
the locking bracket is clamped on the linkage part, the locking bracket is connected with the retaining locking tongue, the movement of the transmission mechanism drives the linkage part and makes the locking bracket extend/retract along the extending/retracting direction of the retaining locking tongue;
the main locking tongue is connected with the locking bracket, and the extending/retracting movement of the locking bracket drives the main locking tongue stretches out or retract from the locking box.

12. The battery case unlocking apparatus of claim 11, wherein:
the linkage part comprises an unlocking push rod, an unlocking swing rod and a locking swing rod;
the unlocking push rod is connected with one end of the transmission mechanism and moves along the moving direction of the transmission mechanism;
the unlocking swing rod is connected with the unlocking push rod, the unlocking swing rod is pin-jointed with a swing shaft fixed on the locking box, the movement of the unlocking push rod drives the unlocking swing rod to swing around the swing shaft;
one end of the locking swing rod is pin-jointed with a spin shaft fixed on the locking box, and the other end of the locking swing rod is arranged at one end of the unlocking swing rod away from the unlocking push rod;
the locking bracket is clamped on one end of the locking swing rod away from the unlocking swing rod, and the locking swing rod rotates about the spin shaft and drives the locking bracket to move along the extending/retracting direction of the retaining locking tongue.

13. The battery case unlocking apparatus of claim 11, wherein, a locking piece is fixed on the locking bracket, the locking piece is provided with a sliding jaw and a stop jaw, the sliding jaw is linked with the stop jaw, the retaining locking tongue is provided with a sliding slope, and the sliding jaw slides along the sliding slope to drive the stop jaw to enter or exit a retracting path of the main locking tongue.

14. The battery case unlocking apparatus of claim 11, wherein, the locking box is also provided with a safety shaft, the safety shaft passes through the locking box and stretches out the locking box, the safety shaft is configured to extend or retract along the axis direction, the safety shaft rotates from an unlock position to a lock position by self-rotation, the safety shaft is provided with a locking pole, and, when the safety shaft rotates to the lock position, the main locking tongue stretches out of the locking box, and the locking pole is against the back end of the main locking tongue.

15. The battery case unlocking apparatus of claim 14, wherein, the safety shaft is provided with an induction pole, the locking box is provided with a sensor, the sensor is capable of being used for detecting the position of the induction pole, and when the safety shaft rotates to the lock position, the sensor is facing the induction pole directly.

16. The battery case unlocking apparatus of claim 14, wherein, a pressing plate is fixed on the inner surface of the locking box away from the body of the battery case, the pressing plate is provided with an unlock position and a lock position, the safety shaft is provided with a block pole, the block pole rotates along with the safety shaft and is capable of being used for switching between the unlock position and lock position.

17. The battery case unlocking apparatus of claim 5, wherein, the battery case unlocking apparatus also comprises a housing, the transmission mechanism and the locking mechanism are arranged within the housing, and the mount and the extensible/retractable mechanism are extensible/retractable arranged along the extending or retracting direction of the extensible/retractable mechanism in the housing.

18. The battery case unlocking apparatus of claim 5, wherein, the mount comprises an electromagnetic chuck, the electromagnetic chuck is sleeved outside one end of the extensible/retractable mechanism away from the transmission mechanism.

19. A battery case, wherein, the battery case comprises:
a body;
a battery case unlocking apparatus of claim 1;
the mount is arranged at one side of the extensible/retractable mechanism away from the body, the extensible/retractable mechanism and the transmission mechanism are arranged at the end part of the body, the locking mechanism is arranged at the side part of the body;
the extensible/retractable mechanism perform extending or retracting movement relative to the end part of the body, and the transmission mechanism moves along the end part of the body.

20. The battery case of claim 19, wherein:
the number of the locking mechanisms is two, the two locking mechanisms are relatively arranged at two side parts of the body;
the number of the transmission mechanisms is two, the two transmission mechanisms are located at two sides of the extensible/retractable mechanism respectively;
the extensible/retractable mechanism drives the two locking mechanisms to lock or unlock through the two transmission mechanisms simultaneously.

21. A quick battery case replacement system, wherein, the quick battery case replacement system comprises:
a battery holder, a replacement device and a battery case of claim 19;
the battery holder is provided with a locking part, the locking mechanism is in locking coordination with the locking part;
the replacement device comprises a replacement device chuck and an unlocking rod which is extensible and retractable passes through the replacement device chuck, the unlocking rod is arranged corresponding to the extensible/retractable mechanism, the stretching movement of the unlocking rod is used to push the extensible/retractable mechanism to retract, drive the locking mechanism and the locking part to unlock, and the replacement device is connected to the battery case through the attracting of the replacement device chuck and the mount.

\* \* \* \* \*